(12) United States Patent
Shah

(10) Patent No.: US 12,037,969 B2
(45) Date of Patent: Jul. 16, 2024

(54) METHOD AND SYSTEM FOR DETECTING A COMPONENT EXCHANGE IN AN IGNITION SYSTEM OF A SPARK-IGNITED ENGINE

(71) Applicant: Caterpillar Energy Solutions GmbH, Mannheim (DE)

(72) Inventor: Darshit Shah, Mannheim (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 298 days.

(21) Appl. No.: 17/615,365

(22) PCT Filed: May 28, 2020

(86) PCT No.: PCT/EP2020/025250
§ 371 (c)(1),
(2) Date: Nov. 30, 2021

(87) PCT Pub. No.: WO2020/239266
PCT Pub. Date: Dec. 3, 2020

(65) Prior Publication Data
US 2022/0228548 A1    Jul. 21, 2022

(30) Foreign Application Priority Data
May 31, 2019    (GB) ..................... 1907748

(51) Int. Cl.
*F02P 17/12*    (2006.01)
*F02P 11/06*    (2006.01)
*F02P 17/10*    (2006.01)

(52) U.S. Cl.
CPC .............. *F02P 17/12* (2013.01); *F02P 11/06* (2013.01); *F02P 17/10* (2013.01); *F02P 2017/121* (2013.01)

(58) Field of Classification Search
CPC .. F02P 17/12; F02P 11/06; F02P 17/10; F02P 2017/121; F02P 15/00; G01M 15/05; G01M 15/08; F02D 2200/50; H01T 13/58
(Continued)

(56) References Cited

U.S. PATENT DOCUMENTS

| | | | |
|---|---|---|---|
| 6,766,243 B1 | 7/2004 | Haussmann et al. |
| 6,918,288 B2 | 7/2005 | Lehner et al. |

(Continued)

FOREIGN PATENT DOCUMENTS

| | | |
|---|---|---|
| CN | 1184942 | 6/1998 |
| DE | 102008007398 A1 | 8/2009 |

(Continued)

OTHER PUBLICATIONS

International Search Report related to Application No. PCT/EP2020/025250; reported on Sep. 15, 2020.
(Continued)

*Primary Examiner* — Giovanni Astacio-Oquendo (57) ABSTRACT

The present disclosure refers to a method for detecting an exchange of a component of an ignition system of a spark-ignited internal combustion engine. The method comprises the step of determining at least one parameter being indicative of an operation or condition of the ignition system; and the step of detecting an exchange of the component based on a comparison of the parameter with at least one reference value.

15 Claims, 7 Drawing Sheets

(58) Field of Classification Search
USPC .......................................... 324/399, 393, 378
See application file for complete search history.

(56) References Cited

U.S. PATENT DOCUMENTS

| | | | |
|---|---|---|---|
| 9,765,750 B2 | 9/2017 | Ferguson et al. | |
| 10,961,973 B2* | 3/2021 | Shah | H01T 13/58 |
| 2007/0186903 A1* | 8/2007 | Zhu | F02P 5/1523 |
| | | | 123/406.28 |
| 2011/0163673 A1 | 7/2011 | Haution et al. | |
| 2013/0228007 A1 | 9/2013 | Moritz et al. | |
| 2015/0042344 A1 | 2/2015 | Bleil et al. | |
| 2016/0138553 A1 | 5/2016 | Senior et al. | |
| 2017/0296056 A1* | 10/2017 | Hresko | A61B 5/0015 |
| 2018/0030616 A1 | 2/2018 | Choi et al. | |
| 2018/0058416 A1 | 3/2018 | Campagna | |
| 2018/0100479 A1 | 4/2018 | Shah et al. | |
| 2018/0306163 A1* | 10/2018 | Rezaei | F02P 9/002 |
| 2019/0353135 A1* | 11/2019 | Chesney | F02D 17/02 |
| 2020/0003173 A1* | 1/2020 | Shah | F02P 3/05 |

FOREIGN PATENT DOCUMENTS

| | | |
|---|---|---|
| DE | 102010040682 A1 | 3/2012 |
| DE | 102016221086 A1 | 4/2018 |
| EP | 3276156 A1 | 1/2018 |
| EP | 3306075 A1 | 4/2018 |
| JP | 2005157767 A | 6/2005 |
| JP | 2008027241 A | 2/2008 |
| RU | 2628224 C2 | 8/2017 |
| RU | 2016124673 A | 12/2017 |

OTHER PUBLICATIONS

Great Britain Search Report related to Application No. 1907748.6; reported on Nov. 20, 2019.
Chinese Office Action and Search report for Chinese Patent Appln. No.202080038814.8, mailed Oct. 21, 2023 (7 pgs).

* cited by examiner

|     | $C_i$ | $C_{i-1}$ | $C_{i-2}$ | ... | $C_{i-n}$ |
|-----|-------|-----------|-----------|-----|-----------|
| RR1 | $RR1_{Ci}$ | $RR1_{Ci}$ | $RR1_{Ci-2}$ | ... | $RR1_{Ci-n}$ |
| RR2 | $RR2_{Ci}$ | $RR2_{Ci-1}$ | $RR2_{Ci-2}$ | ... | $RR2_{Ci-n}$ |
| RR3 | $RR3_{Ci}$ | $RR3_{Ci-1}$ | $RR3_{Ci-2}$ | ... | $RR3_{Ci-n}$ |
| RR4 | $RR4_{Ci}$ | $RR4_{Ci-1}$ | $RR4_{Ci-2}$ | ... | $RR4_{Ci-n}$ |

Fig. 7

METHOD AND SYSTEM FOR DETECTING A COMPONENT EXCHANGE IN AN IGNITION SYSTEM OF A SPARK-IGNITED ENGINE

CROSS-REFERENCE TO RELATED APPLICATION

This Application is a 35 USC § 371 US National Stage filing of International Application No. PCT/EP2020/025250 filed on May 28, 2020 which claims priority under the Paris Convention to Great Britain Patent Application No. 1907748.6 filed on May 31, 2019.

TECHNICAL FIELD

The present invention refers to a method for detecting an exchange of an ignition system's component in a spark-ignited internal combustion engine. Further, the present invention refers to an ignition system for use in a spark-ignited internal combustion engine for performing such a method.

TECHNOLOGICAL BACKGROUND

In spark-ignited internal combustion engines, such as Otto engines, combustion of a fuel mixture charged in a cylinder of an engine is initiated by an ignition system being equipped with a spark plug. In such systems, the spark plug is configured for delivering electric current from a current source to the combustion chamber to ignite the charged fuel mixture within the combustion chamber by an electric spark. As a result, generation of high-temperature and high-pressure gases are initiated within the combustion chamber which apply forces to and thus axially move an associated piston in the cylinder which rotates a crankshaft of the engine. In this way, chemical energy is transformed into mechanical energy.

For ensuring stable operating conditions of the engine, a proper and reliable operation of the ignition system has to be assured. However, ignition systems, i.e. their spark plugs, are usually subjected to considerable wear leading to a limited service life. Thus, to avoid unplanned downtimes and to improve availability and maintenance of the engine, methods are known for monitoring the operating or wear condition of the ignition system and its components in order to avoid malfunction or breakdown of the engine.

For example, EP 3 276 156 A1 discloses a method for detecting a critical wear condition of a spark plug associated to a cylinder of a spark-ignited engine by monitoring a current flow within an ignition system during operation of the engine. In this way, defective spark plugs within the ignition system can be detected before a breakdown or malfunction of the engine occurs.

SUMMARY OF THE INVENTION

Starting from the prior art, it is an objective to provide a method and a system which contribute to an improved monitoring of an ignition system to avoid unplanned downtimes of the engine.

This objective is solved by means of a method having the features of claim 1 and an ignition system for use in an internal combustion engine having the features of claim 15. Preferred embodiments are set forth in the present specification, the Figures as well as the dependent claims.

Accordingly, a method is provided for detecting an exchange of a component of an ignition system of a spark-ignited internal combustion engine. The method comprises the step of determining at least one parameter being indicative of an operation or condition of the ignition system; and the step of detecting an exchange of the component based on a comparison of the parameter with at least one reference value.

Furthermore, an ignition system for use in a spark-ignited internal combustion engine is provided. The ignition system comprises a control unit which is configure to determine at least one parameter being indicative of an operation or condition of the ignition system, and to detect an exchange of a component of the ignition system based on a comparison of the parameter with at least one reference value.

The control unit of the proposed ignition system may be provided for carrying out the above-described method for detecting an exchange of a component of an ignition system. Thus, technical features which are described in connection with the proposed method may also relate and be applied to the proposed ignition system, and vice verse.

BRIEF DESCRIPTION OF THE DRAWINGS

The present disclosure will be more readily appreciated by reference to the following detailed description when being considered in connection with the accompanying drawings in which:

FIGS. 3 to 6 show flow diagrams illustrating sub-steps of the method depicted in FIG. 2;

DETAILED DESCRIPTION OF PREFERRED EMBODIMENTS

In the following, the invention will be explained in more detail with reference to the accompanying Figures. In the Figures, like elements are denoted by identical reference numerals and repeated description thereof may be omitted in order to avoid redundancies.

Figure 1:
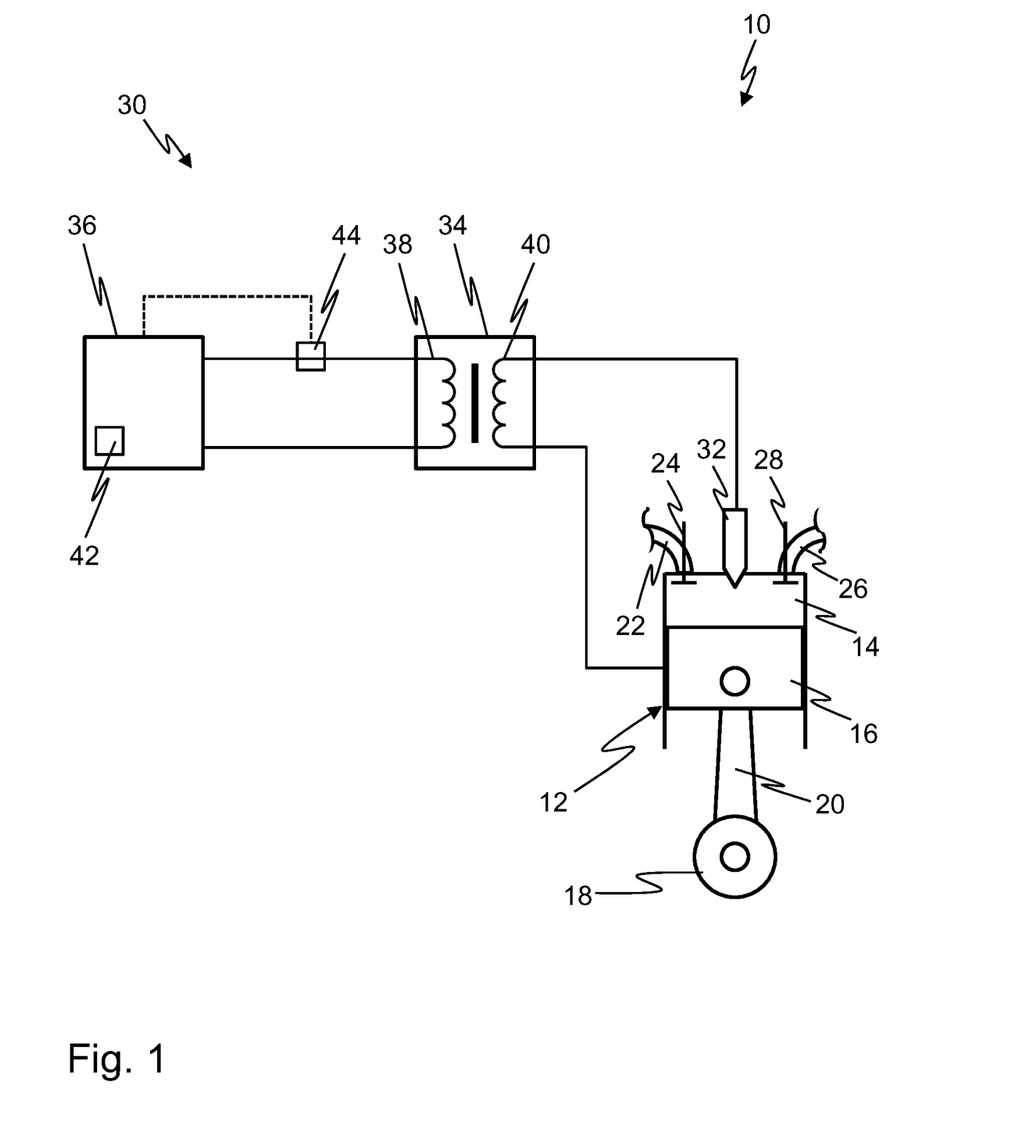
FIG. 1 schematically shows an internal combustion engine being equipped with an ignition system.

FIG. 1 schematically depicts a spark-ignited internal combustion engine 10, also referred to as the 'engine' in the following, provided in the form of a reciprocating engine, in particular a gas engine. However, it will be apparent to one skilled in the art that the engine may be any type of spark-ignited internal combustion engine, for example, a dual fuel engine or any other Otto engine which uses a spark plug for igniting a fuel mixture within a combustion chamber of the engine.

Specifically, the engine 10 comprises at least one cylinder 12, preferably more than one cylinder, e.g. four, six, eight or more cylinders 12. In other words, the engine 10 may be of any size, i.e. with any number of cylinders 12 and in any configuration, such as a V or an inline engine.

Each cylinder 12 is provided with a combustion chamber 14 delimited by the cylinder 12 and a piston 16 accommodated therein. The piston 16 is configured for reciprocatingly moving within the cylinder 12 and is connected to a crankshaft 18 of the engine 10 via a connecting rod 20.

During operation of the engine 10, each one of the combustion chambers 14 is supplied with a fuel mixture which is to be ignited therein so as to produce high-temperature and high-pressure gases which apply forces to and thus axially move the associated pistons 16, thereby rotating the crankshaft 18. In this way, chemical energy is transformed into mechanical energy.

For supplying the fuel mixture into the combustion chamber 14, the engine 10 is equipped with an intake passage 22 opening into the combustion chamber 14, wherein the supply of the fuel mixture into the combustion chamber 14 is variedly adjusted by means of an intake valve 24. The intake passage 22 is configured to provide the fuel mixture by mixing intake air with a fuel medium, in particular natural gas, i.e. comprising hydrocarbon gas.

The combustion chamber 14 of each cylinder 12 is further connected to an exhaust passage 26 for expelling combustion gases from the combustion chamber 14, i.e. after combustion of the fuel mixture took place. For controlling the expelling of combustion gases, an exhaust gas valve 28 is provided which variedly expels exhaust gases from the combustion chamber 14 into the exhaust passage 26.

Further, the engine 10 is equipped with an ignition system 30 having at least one spark plug 32, each of which is associated to one of the at least one cylinder 12.

The basic structure and function of such an internal combustion engine 10 and its components are well known to a person skilled in the art and are thus not further specified. Rather, characteristics of the ignition system 30 of the engine 10 interlinked with the present invention are addressed in the following. Although not further specified in the present disclosure, the skilled person will understand that the internal combustion engine 10 may be equipped with further components, such as a fuel system, an air system, a cooling system, drive train components etc.

The ignition system 30 is configured to ignite the fuel mixture supplied to the combustion chamber 14 by an electric spark generated by the spark plug 32 within the combustion chamber 14. For doing so, the ignition system 30 comprises at least one ignition coil 34, each of which is associated to one cylinder 12. The ignition coil 34 is electrically connected to a control unit 36 and to one of the at least one spark plug 32. The control unit 36 is configured to control operation of the at least one spark plug 32 by selectively supplying a current to the at least one ignition coil 34. In the shown configuration, the control unit 36 is electrically connected to each one of the at least one ignition coil 34 and thus forms a common control unit. Alternatively, the ignition system 30 may be provided with more than one control unit 36, each of which is associated to a different ignition coil 34 and thus to a different cylinder 12 of the engine 10.

The ignition coil 34 comprises a primary winding 38 and a secondary winding 40 inductively coupled to one another. The primary winding 38 is electrically coupled to the control unit 36 for receiving a current from a current source (not shown) and the secondary winding 40 is electrically coupled to the spark plug 32.

More specifically, the control unit 36 is configured to selectively supply a current to the primary winding 38, thereby inducing a magnetic field in the secondary winding 40. This results in an increase in voltages across the spark plug 32. Upon cutting of the supply of current to the primary winding 38, the voltage across the spark plug 32 increases which may lead to a discharge of a spark plug 32 within the combustion chamber 14 and thus to an ignition of the fuel mixture therein. Accordingly, by selectively supplying a current to the primary winding 38, the control unit 36 is configured to control a desired ignition timing for igniting the fuel mixture within the combustion chamber 14.

The control unit 36 is a general engine control module capable of controlling the internal combustion engine 10 and/or its associated components. The control unit 36 may include all components required to run an application, such as, for example, a memory, a secondary storage device, and a processor such as a central processing unit or any other means known in the art for controlling an engine 10 and its components. Various other known circuits may be associated with the control unit 36, including a current supply circuitry, a signal conditioning circuitry, a communication circuitry and other appropriate circuitries. The control unit 36 is configured to analyze and compare received and stored data, and, based on instructions and data stored in memory or input by a user, determine whether an action is required. In the shown configuration, the control unit 36 comprises a memory unit 42 and is configured to compare received values with target values stored in the memory unit 42 and to transmit signals to one or more components based on the results of the comparison to alter the operation status of the same.

In the following, a method for detecting an exchange of a component of the ignition system 30 is described with reference to FIGS. 2 to 4. The method is performed by the control unit 36 which forms a general engine control module of the engine 10, but may be likewise performed by any other suitable control unit.

Figure 2:
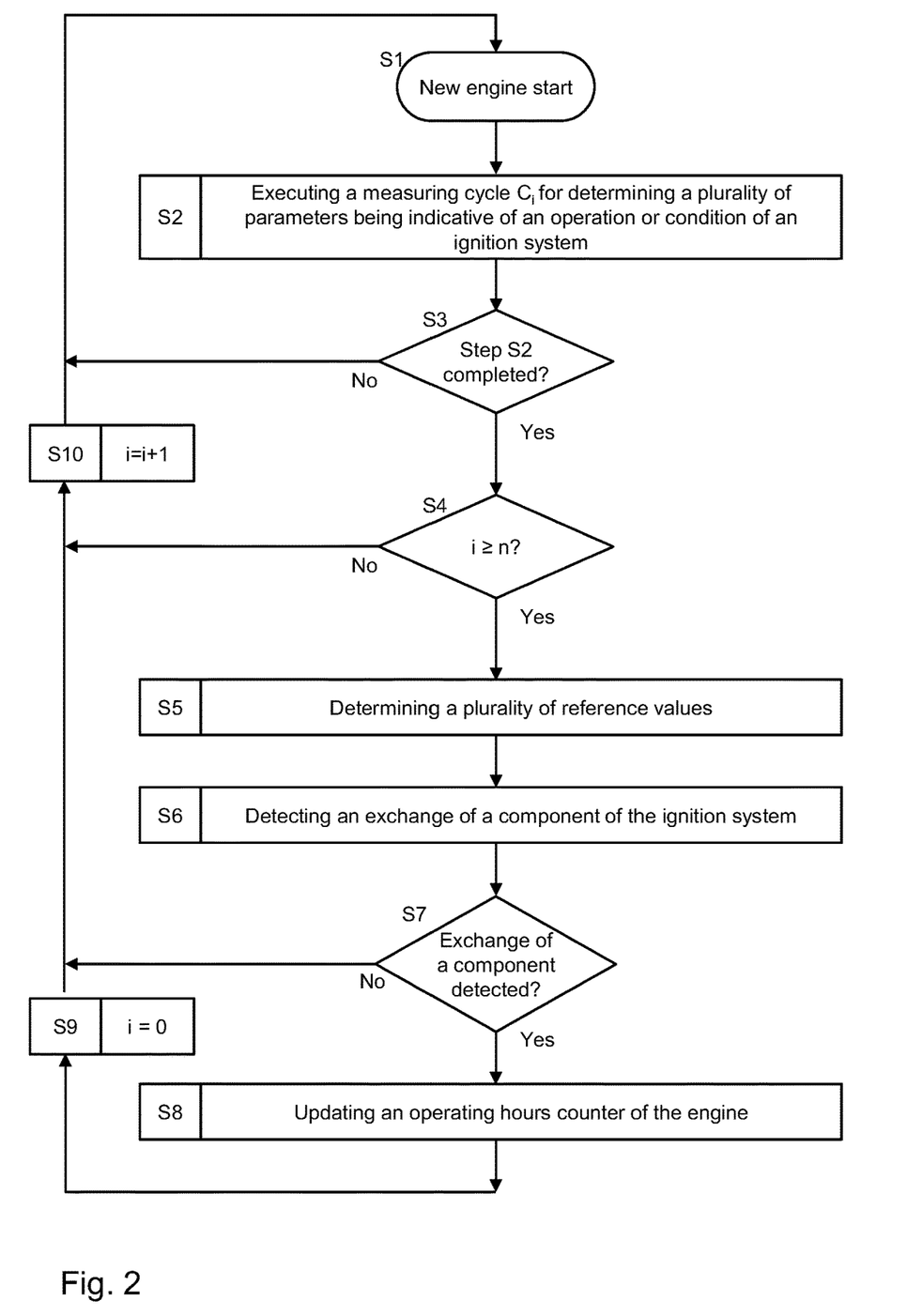
FIG. 2 shows a flow diagram illustrating a method for detecting an exchange of a component of the ignition system depicted in FIG. 1.

FIG. 2 shows a flow diagram illustrating the method for detecting an exchange of a component of the ignition system 30. For reasons of simplicity, in the following, the method is described for detecting an exchange of the component associated to one cylinder 12 of the engine 10. The control unit 36 is also configured to likewise detect an exchange of components associated to the other cylinders 12. However, a repeated description thereof is omitted in order to avoid redundancies.

The proposed method is configured to determine whether a component of the ignition system 36 has been replaced or not. Specifically, the shown method is configured for detecting an exchange of at least one of a spark plug 32 and an ignition coil 34 of the ignition system 30. Alternatively, the method may be configured for detecting an exchange of other components of the ignition system 30.

The method comprises a routine of subsequent steps S2 to S10 which is performed in response to an engine start, i.e. upon receiving an engine start command, as indicated by a terminator step S1 in FIG. 2. In other words, each time the engine 10 is restarted, i.e. when the engine 10 is started after shutdown, the routine or sequence of steps S2 to S10 is initiated.

When an engine start is initiated, step S2 is carried out, during which a plurality of parameters RR1 to RR4 is determined. For doing so, in step S2, a measuring cycle $C_i$ is executed, during which the plurality of parameters are determined. Specifically, the plurality of parameters is determined for each cylinder 12 separately.

Figure 3:
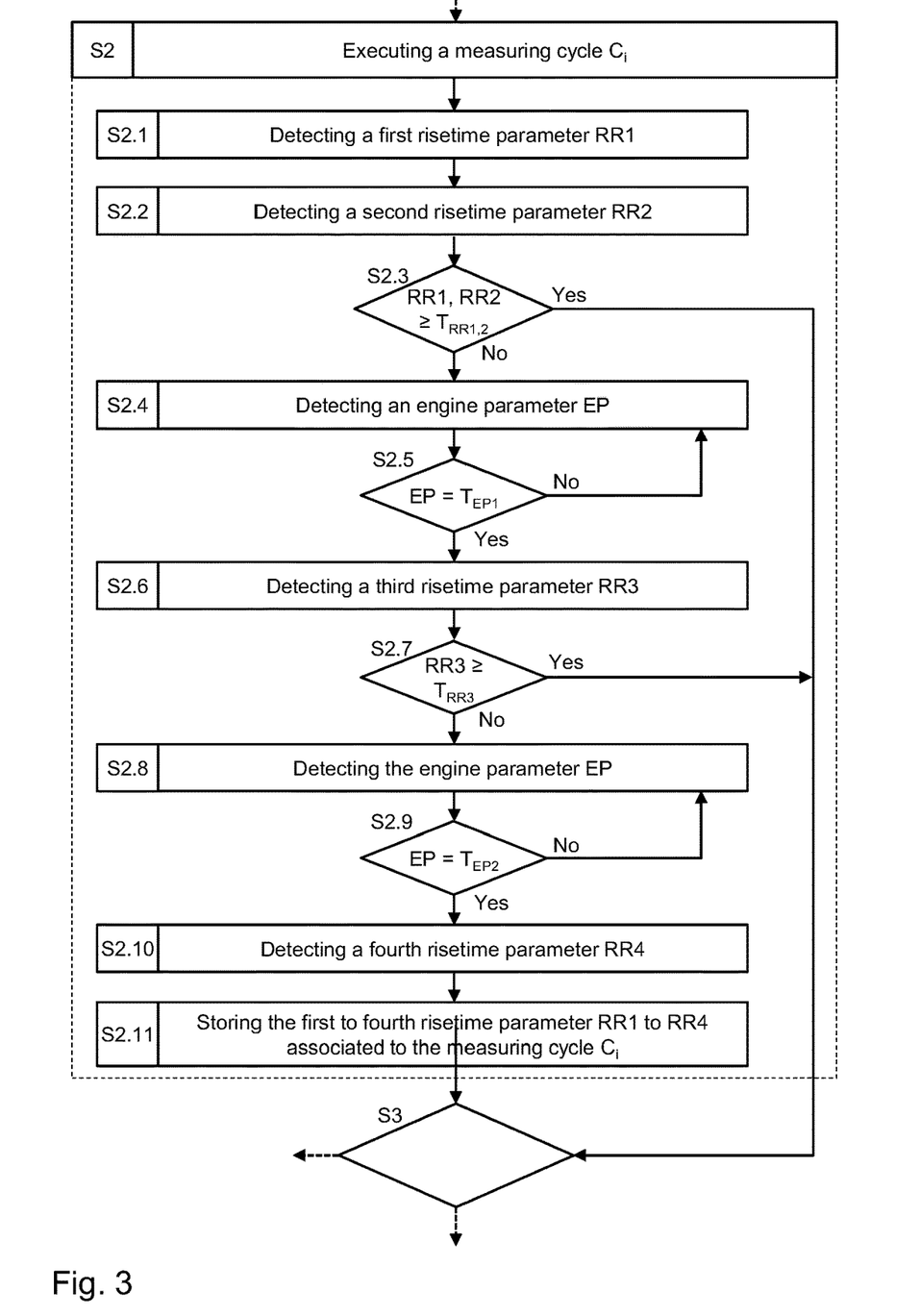
Figure 4:
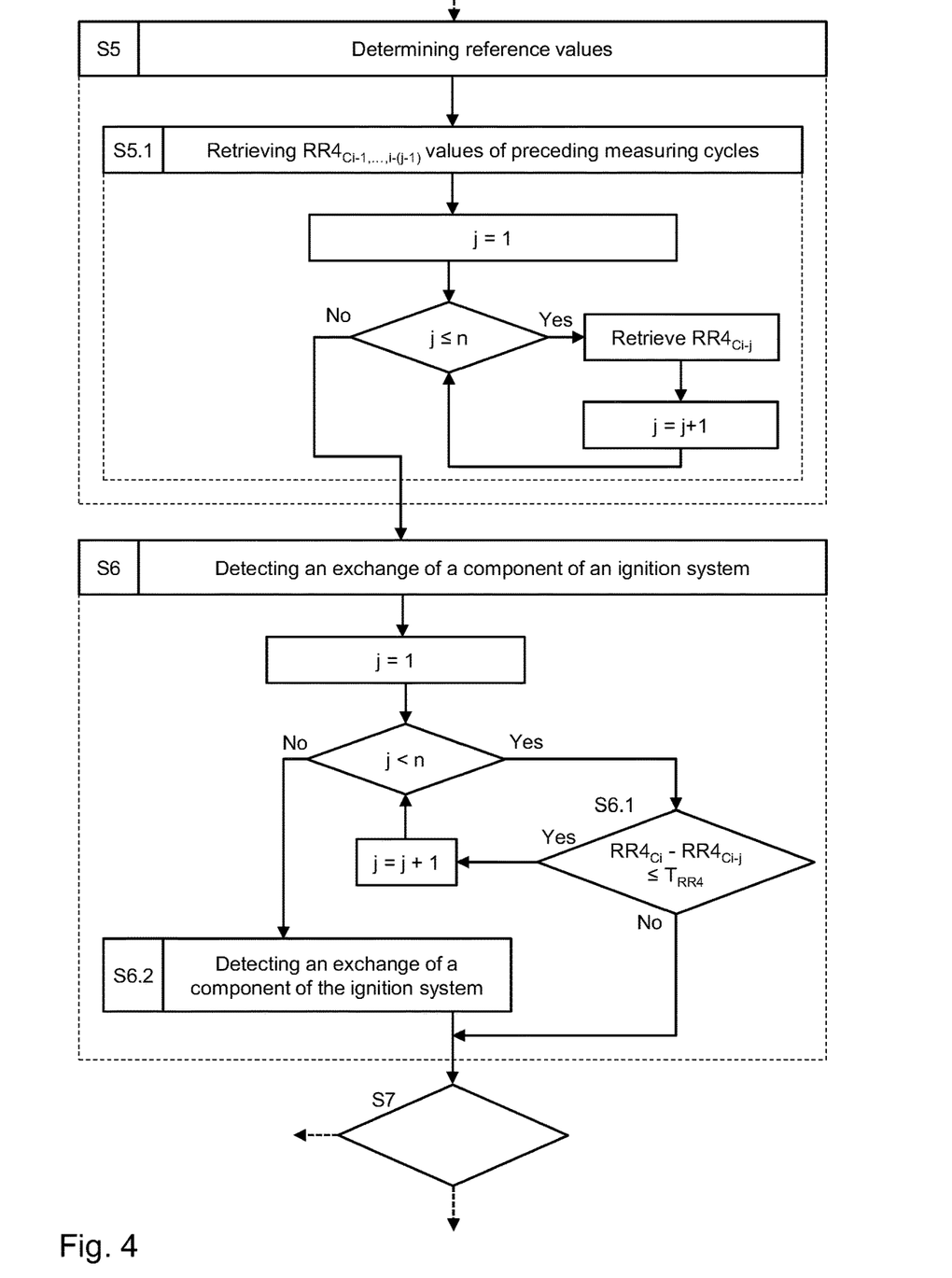

FIG. 3 depicts a flow diagram illustrating the step S2 of executing the measuring cycle $C_1$ in more detail by showing its sub-step S2.1 to S.11. During execution of one measuring cycle Ci, a plurality of parameters, i.e. four parameters RR1 to RR4 are determined which are indicative of an operation or condition of the ignition system 30. Generally, the parameters RR1 to RR4 quantify a characteristic of the engine 10 which is indicative of an operation or condition of the ignition system 36. In the context of the present invention, the term "indicative of an operation of the ignition system" may refer to parameters which quantify or specify an operating characteristic or condition of the ignition system 36, i.e. which is linked to a specific operating state thereof. The term "indicative of a condition of the ignition system" may refer to parameters which quantify or specify a condition, e.g. a state of health, ageing condition, wear condition, etc., of the ignition system 36, which in particular is independent of a specific operating state thereof.

In the shown configuration, the four parameters RR1 to RR4 refer to, i.e. quantify the same characteristic of the ignition system 36 which are determined or measured during different operating conditions as can be gathered from steps S2.1, S2.2, S2.6 and S2.10. The parameters RR1 to RR4 are indicative of a current flowing through the ignition coil 34 of the ignition system 30 during actuation of the spark plug. In particular, each of the parameters RR1 to RR4 is indicative of a current risetime duration in the primary winding 38 of the ignition coil 34 and may thus also be referred to as 'risetime parameter'. In this context, the term "current risetime duration", also referred to as pull-in time or ignition delay, corresponds to a time required for a current flowing through the primary winding 38 to rise from an inactive level to a predefined level. In other words, the term "current risetime duration" refers to a time from starting supply of current to the primary winding 38 until the current flowing through the primary winding 38 reaches a first global maximum.

For determining the parameters RR1 to RR4, the ignition system 30 is equipped with a current detector 44 provided in the current path between the primary winding 38 and the control unit 36 or the current source and configured to determine instantaneous values of the current flowing through the primary winding 38. The current detector 44 is connected to the control unit 36 for transmitting the determined values thereto as indicated by a dashed line in FIG. 1.

Alternatively or additionally, the parameters may be indicative of a voltage risetime duration in the secondary winding 40 of the ignition coil 34. In this context, the term "voltage risetime duration" refers to a time required for a voltage across the spark plug 32 to rise from an inactive level to a predefined level. For doing so, the ignition system 30 may be equipped with a voltage detector coupled across the spark plug 32 and configured to determine instantaneous values of voltage across the spark plug 32. The voltage detector may be connected to the control unit 36 for transmitting the determined values thereto.

Alternatively or additionally, the parameters may be indicative of a spark time or spark time duration. In this context, the term "spark time" refers to a point in time, at which a spark is generated at the spark plug 32. The spark time may be expressed relative to a starting point, at which actuation of the spark plug is initiated. Accordingly, the term "spark time duration" refers to a duration from the starting point, at which actuation of the spark plug 48 is initiated, to the point in time, at which the spark is generated. For determining the spark time or spark time duration, the above described voltage detector may be used.

Specifically, the parameters RR1 to RR4 may be expressed in the form of dimensional numbers, e.g. in seconds, or in the form of non-dimensional numbers. For example, when being expressed in the form of non-dimensional numbers, the parameters RR1 to RR4 may be determined based on statistical mean values and variance or standard deviation. In this way, the effect of both mean and standard deviation may be combined into a unique number for quantifying the parameters RR1 to RR4.

In step S2.1, a first parameter RR1 is determined during a prestart operating mode of the engine 10. Specifically, during the prestart mode, the engine 10 is not yet running, i.e. neither a starting device drives the engine 10, nor a combustion in the combustion chamber 14 occurs. In other words, no compression occurs in the cylinder 12 during the engine prestart mode. The engine prestart mode may be used to prepare the engine 10 for operation, for example, by pre-lubricating the moving components.

Then, in step S2.2, a second parameter RR2 is determined during a purge mode of the engine 10, during which the engine 10 is driven by the starting device, for example, to purge the intake passage 22, the combustion chambers 14 and exhaust passage 26. In particular, during the engine purge mode, the pistons 16 reciprocate and a compression in the combustion chambers 14 occurs. The second parameter RR2 determined during the purge mode may be considered as a quasi-optimal value for the parameter. This is due to the fact that the medium density in between the electrodes of the spark plug 32 is lower than in an operating or combustion mode of the engine 10 since in the engine purge mode no charging and thus no combustion in the combustion chamber 14 occurs. During proper operation of the engine 10 and the ignition system 30, i.e. when no failure occurs, the value for the parameter, i.e. current risetime duration, in the purge mode is greater compared to an operating or combustion mode of the engine 10.

The engine purge mode and accordingly step S2.2 may particularly be performed for large internal combustion engines 10, e.g. having a power output of more than 50 kW, particularly 80 kW, per cylinder. Such engines 10 may run on marine vessels or as drive sources of stationary power plants.

Thereafter, the method proceeds to decision step S2.3, at which the first and the second parameter RR1, RR2 are compared with a corresponding threshold $T_{RR1}$, $T_{RR2}$, respectively. In this step, it is determined whether the ignition system 30 is subjected to any anomaly or failure indicating that the exchange detection or measuring cycle cannot be properly executed. Specifically, an anomaly or failure condition of the ignition system 30 is determined when either the first parameter RR1 equals to or is greater than a first threshold $T_{RR1}$ or the second parameter RR2 equals to or is greater than a second threshold $T_{RR2}$. In this case, the measuring cycle $C_1$ is not completed and the method proceeds directly to step S3. However, if it is determined in step S2.3 that the first parameter RR1 is below the first threshold $T_{RR1}$ and that the second parameter RR2 is below the second threshold $T_{RR2}$, the method proceeds to step S2.4.

In a further development, the method may alternatively or additionally check in step S2.3 whether the first and a second parameter RR1, RR2 are greater than further thresholds being smaller than the first and the second threshold $T_{RR1}$, $T_{RR2}$. In other words, in step S2.3, the control unit 36 may check whether each one of the first and the second parameter RR1, RR2 are within an expected range. If this is the case, the method proceeds to step S.2.4. If the first and the second parameter RR1, RR2 are outside the expected range, respectively, the method proceeds to step S3.

In step S2.4, an engine parameter EP is determined. The engine parameter EP is indicative of an operational state of the engine. Specifically, the engine parameter is indicative of or corresponds to an engine load or engine speed.

Thereafter, the determined engine parameter EP is compared to a third threshold $T_{EP1}$ in a further step S2.5. If the engine parameter EP determined during step S2.4 equals to the third threshold $T_{EP1}$, the method proceeds to step S2.6. If the engine parameter EP does not equal to, i.e. is lower than the third threshold $T_{EP1}$, the method returns to step S2.4. In this way, the method proceeds to step 2.6 only when the engine parameter EP reaches the third threshold $T_{EP1}$, i.e. when the engine 10 is operated at a predefined first minimum engine load. Specifically, the third threshold $T_{EP1}$ may be expressed in the form of a range such that the method proceeds to step S2.6 when the engine parameter EP is within the range.

In step S2.6, a third parameter RR3 is determined. This is performed during a first load operating mode, during which the engine 10 is operated at a load corresponding to the first minimum engine load preset by the third threshold $T_{EP1}$.

In a next step S2.7, the determined third parameter RR3 is compared to a fourth threshold $T_{RR3}$ to determine an anomaly or failure condition of the ignition system 30 indicating that the exchange detection or measuring cycle cannot be properly executed. Specifically, if it is determined that the third parameter RR3 equals to or is greater than the fourth threshold $T_{RR3}$, the measuring cycle $C_i$ is not completed and the method proceeds to step S3. However, if it is determined that the third parameter RR3 is below the third threshold $T_{RR3}$, the method proceeds to step S2.8.

Step S2.8 corresponds to step S2.4. In step S2.9, the determined engine parameter EP is compared to a fifth threshold $T_{EP2}$. If the engine parameter EP determined during step S2.8 equals to the fifth threshold $T_{EP2}$, the method proceeds to step S2.10. If the engine parameter EP does not equal to, i.e. is lower than the fifth threshold $T_{EP2}$, the method returns to step S2.8. In this way, the method proceeds to step 2.10 only when the engine parameter EP reaches the fifth threshold $T_{EP2}$, i.e. when the engine 10 is operated at a predefined second minimum engine load.

In step S2.10, a fourth parameter RR4 is determined. This is performed during a second load operating mode, during which the engine 10 is operated at a load corresponding to the second minimum engine load preset by the fifth threshold $T_{EP2}$.

The third and the fifth threshold $T_{EP1}$, $T_{EP2}$ may be determined individually for the engine 10, e.g. by virtue of a load histogram, such that they correspond to a reference load of the engine 10, at which a difference in the risetime parameter can be recognized between a state, in which a new spark plug is installed, and a state, in which a worn out spark plug is installed. Such a difference in the risetime parameter is recognizable only in parts of the engine's load spectrum. For example, these reference load points may be derived and/or validated experimentally.

In a next step S2.11, the measurement cycle $C_1$ is completed upon storing the determined first to fourth risetime parameters RR1 to RR4 in the memory unit 42 of the control unit 36. Specifically, the determined parameters RR1 to RR4 are stored in a data set format, in which they are associated to the corresponding measuring cycle, i.e. during which they have been determined. For example, the determined parameters RR1 to RR4 may be stored in a tabular form, e.g. in a matrix form, as depicted in FIG. 7.

Figure 7:
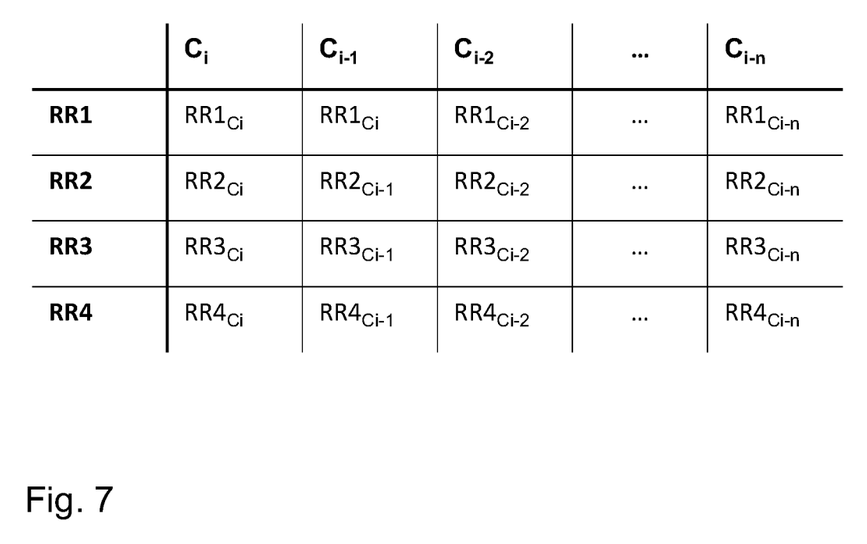
FIG. 7 shows a table illustrating data sets in a matrix form stored in a control unit of the ignition system depicted in FIG. 1.

FIG. 7 illustrates a matrix comprised in the memory unit 42 for storing the determined parameters RR1 to RR4. Specifically, in the depicted matrix, the individual rows are associated to the different risetime parameters RR1 to RR4, wherein the individual columns are associated to the different measurement cycles $C_i$. In this way, upon completion of a measuring cycle $C_i$, a complete column is filled so as to store the determined parameters RR1 to RR4 associated to the measuring cycle $C_i$. For example, the control unit 36 may be configured to store the determined values associated to the most recent, e.g. the four most recent, measuring cycles. In this way, an efficient use of the memory unit 42 may be ensured. For doing so, the memory unit 42 may fill the matrix in a first in first out manner.

After executing the measuring cycle $C_i$ in step S2, the method proceeds to decision step S3, in which it is determined whether the measuring cycle $C_i$ has been completed or not, i.e. whether all risetime parameters RR1 to RR2 have been determined and stored in the memory unit 42. If it is determined that previous step S2 and thus the measuring cycle $C_i$ has not been completed, the method stops the routine by returning to step S1. However, if it is determined that previous step S2 and thus measuring cycle $C_i$ has been completed, the method proceeds to step S4.

In decision step S4, it is determined whether the control variable "i" equals to or exceeds a parameter "n". In this context, the parameter "n" refers to a minimal number of measuring cycles that have to be completed before the method can proceed to step S5. In the shown configuration, parameter n equals to 4. Alternatively, parameter n may be any other positive integer, e.g. 2, 3, 5 or 6. If it is determined that the control variable i is lower than the parameter n, the method stops the routine by proceeding to step S10. However, if it is determined that the variable i is equal to or greater than the parameter n, the method proceeds to step S5. By step S4, it is ensured that the measuring cycle for determining the different parameters RR1-RR4 is performed and completed for at least four measuring cycles before the subsequent steps of the routine are executed.

In step S5, the method determines a plurality of reference values, i.e. three reference values $RR4_{C1-1}, \ldots, C_{1-3}$ to be compared with the determined fourth parameter $RR4_{Ci}$, in the subsequent step S6. For doing so, the values of the fourth parameter associated to three preceding measuring cycles $RR4_{C1-1}, \ldots, C_{1-3}$ are retrieved from the memory unit 42 as can be gathered from step 5.1 depicted in FIG. 4. In the shown method step S5.1, the parameter "j" represents a further control variable of the method. Specifically, each one of the different reference values $RR4_{C1-1}, \ldots, C_{1-3}$ corresponds to a value of the fourth parameter RR4 determined during a different one of three subsequent measuring cycles $C_{i-1}, \ldots, i-3$, i.e. which have been executed prior to the recent measuring cycle $C_i$.

Then, the method proceeds to step S6 of detecting an exchange of a component of the ignition system 30. In this step, an exchange of the component is detected based on a comparison of the fourth parameter $RR4_{Ci}$, which has been determined during the recent measuring cycle $C_i$, and the three reference values $RR4_{C1-1}, \ldots, C_{1-3}$. For doing so, as can be gathered from FIG. 4, a difference between the fourth parameter RR40 and each one of the three reference values $RR4_{C1-1}, \ldots, C_{1-3}$ is subsequently determined and compared to a sixth threshold $T_{RR4}$ in step 6.1. If each one of the thus determined differences equals to or falls below the sixth threshold $T_{RR4}$, an exchange of the component of the ignition system 30 is detected in step S6.2.

Thereafter, the method proceeds to decision step S7, at which it is determined whether an exchange of a component has been detected in previous step S6. If it is determined that an exchange of a component has not been detected during the preceding step S6, the routine is interrupted and the method proceeds to step S10. However, if it is determined that an exchange of a component has been detected in the preceding step S6, the method proceeds to step S8 in which a counter of the engine 10, in particular an operating hours counter or a counter indicating the produced work associated to the one cylinder 12, is updated. In this way, the proposed method provides information on when a component of the ignition system 30 has been changed. Based on this information, an improved lifetime prediction of the ignition system 30, i.e. its ignition coil 14 and/or its spark plug 32, is enabled.

Figure 5:
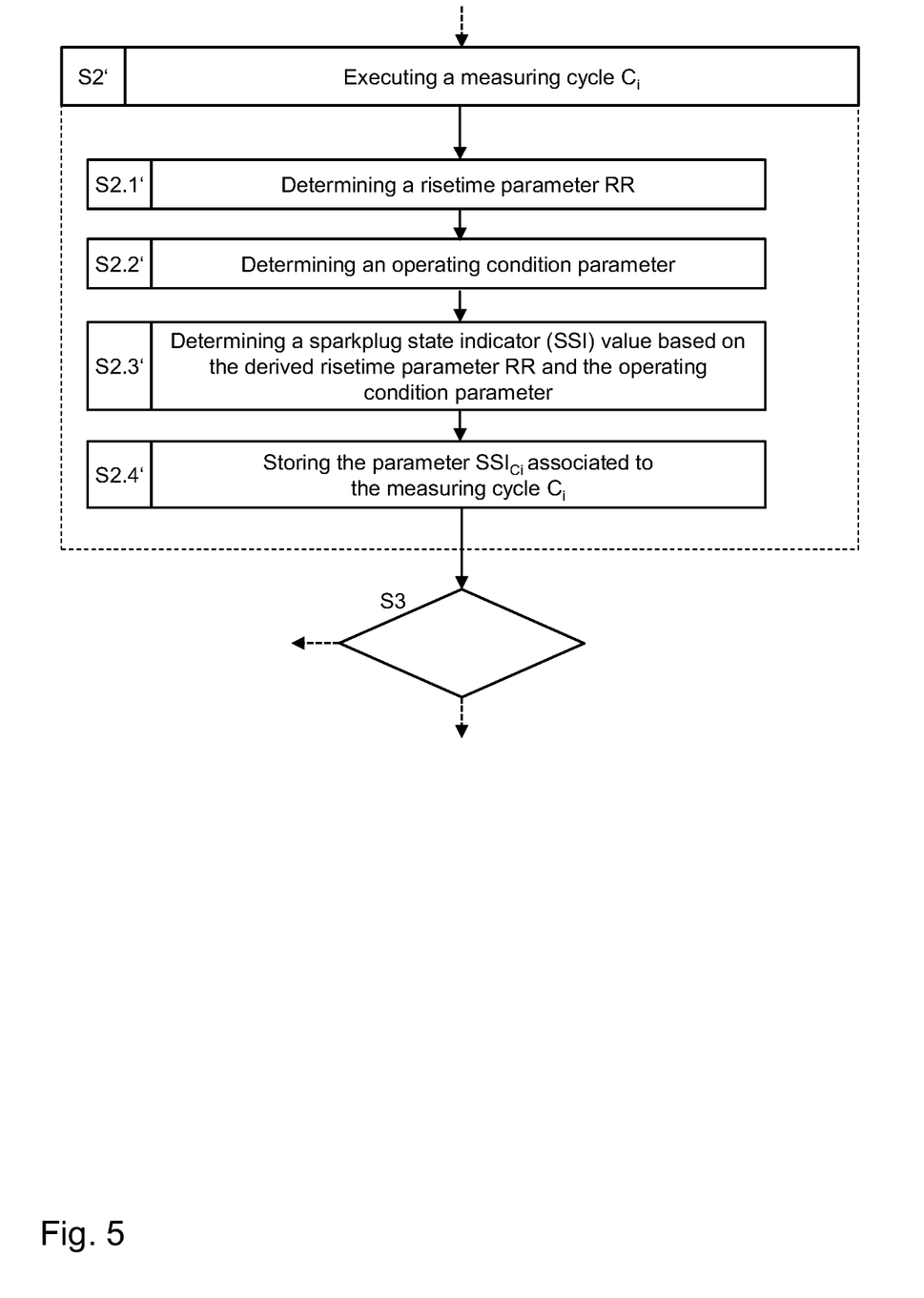
FIGS. 5 and 6 show a flow diagrams illustrating sub-steps of the method depicted in FIG. 2 according to another embodiment.
Figure 6:
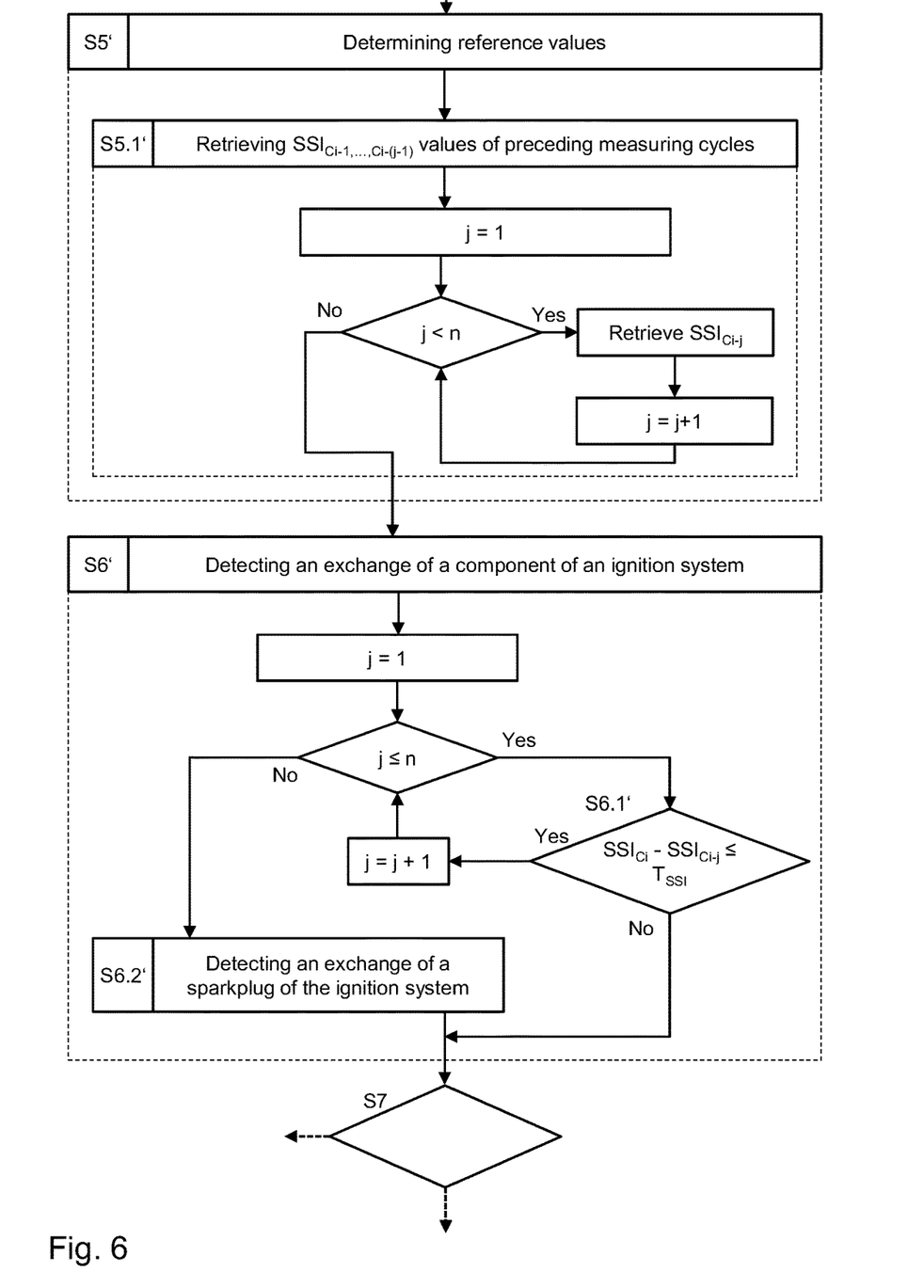

FIGS. 5 and 6 refer to another embodiment of the method for detecting an exchange of a component of the ignition system 30. Compared to the configuration depicted in FIGS. 2 to 4, the method according to FIGS. 5 and 6 is configured to detect an exchange of a spark plug 32 based on a parameter being indicative of a condition of the spark plug 32. Specifically, the method of FIGS. 5 and 6 differs from that one depicted in FIGS. 2 to 4 by method steps 2', 5' and 6' which are specified in the following. It is pointed out that, in the proposed method, the method steps 2', 5' and 6' depicted in FIGS. 5 and 6 may be performed alternatively or additionally to the method steps 2, 5 and 6 depicted in FIGS. 2 to 4.

Specifically, in step S2' the measuring cycle $C_i$ is performed so as to determine the parameter being indicative of the condition of the spark plug 32. Specifically, the parameter to be determined is referred to as a spark plug state indicator (SSI) in the following. In a sub-step S2.1', a risetime parameter RR is determined which is indicative of at least one of a current risetime duration in the primary winding 38, a voltage risetime duration in the secondary winding 40 and a spark time. Specifically, the step S2.1 may be performed when the engine 10 reaches a predefined operating condition, e.g. a minimal load operating condition.

Thereafter, an operating condition parameter of the engine 10 is determined in step S2.2'. Specifically, the operating condition parameter is a density of fuel mixture at ignition time. For determining the operating condition parameter, the control unit 36 may be connected to a pressure sensor (not shown) which is configured to determine a pressure prevailing in the combustion chamber 14. Based on the determined pressure, the control unit 36 may be configured to calculate the density of fuel mixture at ignition time.

Then, in step S2.3', a value for the SSI is determined based on the determined risetime parameter RR and the operating condition parameter. Specifically, this may be performed based on a mathematical model, e.g. a three dimensional map, according to which the value of the SSI is determined as a function of the determined risetime parameter RR and the determined operating condition parameter. Specifically, this mathematical model may be defined and/or calibrated based on fundamental investigation, accelerated testing and/or actual behavior of spark plugs over time. The calibration may vary depending on the engine 10, its application and/or the type of the ignition system 30.

Subsequently, in step S2.4', the determined SSI value is stored in the memory unit 42 in a data set format, in which it is associated to the corresponding measuring cycle $C_i$, i.e. during which it has been determined, for example, in a tabular form, e.g. in a matrix, in which the individual columns or rows are associated to the different measuring cycle.

In step S5', the method determines a plurality of reference values, i.e. three reference values $SSI_{Ci-1, \ldots, Ci-3}$ to be compared with the determined $SSI_{Ci}$ value in step S6'. For doing so, the reference values $SSI_{Ci-1, \ldots, Ci-3}$ associated to three preceding measuring cycles $C_{i-1, \ldots, i-3}$ are retrieved from the memory unit 42 as can be gathered from step S5.1' depicted in FIG. 6. In other words, each one of the different reference values $SSI_{Ci-1, \ldots, Ci-3}$ corresponds to a value of the parameter SSI determined during a different one of three subsequent measuring cycles $C_{i-1, \ldots, i-3}$, i.e. which have been executed prior to the recent measuring cycle $C_i$.

Then, the method proceeds to step S6' of detecting an exchange of the spark plug 32 of the ignition system 30. In this step, an exchange of the spark plug 32 is detected based on a comparison of the parameter $SSI_{Ci}$, which has been determined during the recent measuring cycle $C_i$, and the three reference values $SSI_{C1-1, \ldots, C1-3}$. For doing so, as can be gathered from FIG. 6, a difference between the parameter $SSI_{Ci}$ and each one of the three reference values $SSI_{C1-1, \ldots, C1-3}$ is subsequently determined and compared to a seventh threshold $T_{SSI}$ in step 6.1'. If each one of the thus determined differences equals to or falls below the seventh threshold $T_{SSI}$, an exchange of the spark plug 32 of the ignition system 30 is detected in step S6.2' as can be gathered from FIG. 6.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

This is in particular the case with respect to the following optional features which may be combined with some or all embodiments, items and/or features mentioned before in any technically feasible combination.

A method may be provided for detecting an exchange of a component of an ignition system of a spark-ignited internal combustion engine. The method may comprise a step of determining at least one parameter being indicative of an operation or condition of the ignition system; and a step of detecting an exchange of the component based on a comparison of the parameter with at least one reference value.

Specifically, the method may be provided such that the component, the exchange of which is to be detected, is at least one of a spark plug and an ignition coil of the ignition system.

By detecting an exchange of the component of the ignition system, the proposed method provides information on when a component, e.g. a spark plug, of the ignition system has been changed. Based on this information, a remaining lifetime of the ignition system's components may be determined, thereby contributing to an improved lifetime prediction. Specifically, the proposed method may enable to automatically detect an ignition system's component change and to store information related thereto. Based on this information, monitoring of an ignition system may be improved so as to more reliably prevent the engine from being subjected to unplanned downtimes.

The proposed method may be employed in connection with any suitable spark-ignited internal combustion engine, i.e. an engine in which combustion of a fuel mixture is initiated by a spark generated within a combustion chamber, e.g. by a spark plug. For example, such an engine may be a gas engine, a dual fuel engine or any other type of Otto engine which uses a spark plug for igniting a fuel mixture within a combustion chamber of the engine. The engine may be used to power any machine or device, including ships or other marine applications, locomotive applications, on-highway trucks or vehicles, off-highway machines, generators, pumps, stationary equipment such as power plants, or other engine-powered applications.

The method may be performed in response to an engine start. Specifically, the step of determining the at least one parameter may be initiated in response to an engine start.

The step of determining the at least one parameter may comprise a sub-step of determining an engine parameter being indicative of operational state of the engine. In particular, the parameter may express an engine load or engine speed. The method may be provided such that the step of determining the at least one parameter is performed when the determined engine parameter has reached a predefined threshold value. In this way, it may be ensured that the engine is operated at a predefined load. It has been found that, for some applications, detection of a component exchange is particularly advantageous in parts of the engine's load spectrum. This may be taken into account by ensuring that the engine is operated at a predefined load or in a predefined load range when the step of determining the at least one parameter is performed.

Specifically, in the step of determining the at least one parameter, a plurality of parameters may be determined. This may be performed during a measuring cycle. In other words, by performing a measuring cycle, the plurality of parameters may be determined. The plurality of parameters may be determined such that each one of the plurality of parameters is determined during a different engine operating condition. Accordingly, the different parameters determined during a measuring cycle may be associated to different engine operating conditions.

For doing so, the step of determining the at least one parameter may comprise a sub-step of determining a first parameter during an engine prestart operating condition. Alternatively or additionally, the step of determining the at least one parameter may comprise a sub-step of determining a second parameter during an engine purge condition. Alternatively or additionally, the step of determining the at least one parameter may comprise a sub-step of determining at least one third parameter during a condition in which the engine has reached a minimal engine speed or engine load or is operated within a predefined engine speed or load range.

Specifically, the at least one parameter may be indicative of a current flowing through an ignition coil of the ignition system during actuation of the spark plug. In particular the parameter may be indicative of at least one of a current risetime duration in a primary winding of the ignition coil, a voltage risetime duration in a secondary winding of the ignition coil and a spark time.

Alternatively or additionally, the at least one parameter may be indicative of a condition of a spark plug, which in particular is determined based on at least one of an engine operating parameter, in particular a density of fuel mixture at ignition time, and a current risetime duration in a primary winding of an ignition coil of the ignition system or a spark time.

In a further development, the step of determining the at least one parameter may comprise a sub-step of storing the determined parameter in a data set on a memory unit, in which the determined parameter may be associated to the corresponding measuring cycle, in particular in a tabular or matrix form.

The method may be provided such that the step of determining the at least one parameter is performed and completed for at least two, in particular three, four or five measuring cycles before the step of detecting the exchange of the component is performed.

The method may comprise a further step of determining the at least one reference value. The reference value may correspond to a value of the parameter determined during a preceding or previous measuring cycle, in particular compared to the measuring cycle during which the step of determining the at least one parameter is performed.

In a further development, in the step of determining the at least one reference value, a plurality of reference values, in particular at least three, four or five reference values may be determined for at least one of the at least one parameter. Each one of the reference values associated to one parameter may correspond to a value of the parameter determined during a different one of a corresponding number of subsequent measuring cycles.

The method may be provided such that an exchange of a component may be detected when the determined parameter and/or the reference values show a directional change in trend or magnitude, e.g. by comparing them with thresholds. By comparing the parameter with more than one reference value, system variance or other disturbance may be taken into account, thereby providing a robust method.

Further, in the step of detecting an exchange of the component, a difference between the parameter and each one of the at least one associated reference value may be determined, and wherein the exchange of the component is detected based on the at least on determined difference, in particular based on a comparison of the determined at least one difference with a threshold. Specifically, the exchange of the component may be detected if each one of the at least one determined difference exceeds a threshold.

The method may comprise a further step of storing an exchange time, i.e. a time when the exchange has been detected. Further, the method may comprise a step of providing a lifetime, i.e. corresponding to a predicted lifetime, of the component, e.g. in hours or work produced, based on the determined exchange time, e.g. by determining a difference between the exchange time and a time when the component has been installed. In this way, an absolute operating hour may be noted and stored when an exchange is detected. This may serve as a reference value for the associated component.

Furthermore, an ignition system for use in a spark-ignited internal combustion engine is provided. The ignition system may comprise a control unit which is configured determined at least one parameter being indicative of an operational condition of the ignition system and to detect an exchange of a component of the ignition system based on a comparison of the parameter of at least one reference value.

INDUSTRIAL APPLICABILITY

With reference to the Figures, a method and an ignition system 30 for detecting an exchange of a component of an ignition system 30 of a spark-ignited internal combustion engine 10 is suggested. The method may be performed by a control unit 36 of the ignition system 30.

The method and the ignition system 30 as mentioned above are applicable in any spark-ignited reciprocating engine and especially in gas or dual fuel engines. The suggested ignition system 30 may replace conventional ignition system and may serve as a replacement or retrofit part.

The invention claimed is:
1. A method for detecting an exchange of a component of an ignition system of a spark-ignited internal combustion engine, comprising the steps of:
   determining at least one parameter being indicative of an operation or condition of the ignition system; and detecting an exchange of the component based on a comparison of the parameter with at least one reference value indicative of the remaining lifetime of the component.

2. The method according to claim 1, wherein the component of the ignition system is at least one of a spark plug and an ignition coil.

3. The method according to claim 1, wherein the step of determining the at least one parameter is initiated in response to an engine start.

4. The method according to claim 1, wherein the step of determining the at least one parameter comprises the sub-step of determining an engine parameter being indicative of an operational state of the engine, and wherein the at least one parameter is determined when the engine parameter has reached a predefined threshold.

5. The method according to any one of claim 1, wherein in the step of determining the at least one parameter, a plurality of parameters are determined during a measuring cycle which are associated to different engine operating conditions.

6. The method according to claim 1, wherein the step of determining the at least one parameter comprises at least one of the sub-steps:
determining a first parameter during an engine prestart mode;
determining a second parameter during an engine purge mode; and
determining a third parameter during an operating mode, in which the engine has reached a minimal engine speed or engine load.

7. The method according to claim 1, wherein at least one parameter is indicative of a current flowing through an ignition coil of the ignition system during actuation of the spark plug, wherein in particular the parameter is indicative of at least one of a current risetime duration in a primary winding of the ignition coil, a voltage risetime duration in a secondary winding of the ignition coil and a spark time.

8. The method according to claim 1, wherein at least one parameter is indicative of a condition of the spark plug, which in particular is determined based on at least one of an engine operating parameter, in particular a density of fuel mixture at ignition time, and a current risetime duration in the primary winding of the ignition coil of the ignition system or a spark time.

9. The method according to claim 1, wherein the step of determining the at least one parameter comprises a sub-step of storing the determined parameter in a data set on a memory unit, in which the determined parameter is associated to the corresponding measuring cycle.

10. The method according to claim 1, wherein the step of determining the at least one parameter is performed and completed for at least two, in particular three or five, measuring cycles before the step of detecting the exchange of the component is performed.

11. The method according to claim 1, wherein the reference value corresponds to a value of the parameter determined during a preceding or previous measuring cycle, in particular compared to the measuring cycle during which the step of determining the at least one parameter is performed.

12. The method according to claim 1, further comprising a step of determining the at least one reference value for the parameter in which a plurality of reference values are determined for at least one of the at least one parameter, wherein each one of the reference values associated to one parameter corresponds to a value of the parameter determined during a different one of a corresponding number of subsequent measuring cycles.

13. The method according claim 1, wherein in the step of detecting an exchange of the component, a difference between the parameter and each one of the at least one associated reference value is determined, and wherein the exchange of the component is detected based on the at least on determined difference.

14. The method according to claim 13, wherein the exchange of the component is detected if each one of the at least one determined difference exceeds a threshold.

15. An ignition system for use in a spark-ignited internal combustion engine, comprising a control unit which is configure to determine at least one parameter being indicative of an operation or condition of the ignition system, and to detect an exchange of a component of the ignition system based on a comparison of the parameter with at least one reference value indicative of the remaining lifetime of the component.

* * * * *